United States Patent [19]

Scott

[11] Patent Number: 4,942,046

[45] Date of Patent: Jul. 17, 1990

[54] LAMP CONTROL PROCESS FOR WARMING FOOD

[76] Inventor: Arthur C. Scott, 427 Elm St., Deerfield, Ill. 60015

[21] Appl. No.: 194,267

[22] Filed: May 16, 1988

[51] Int. Cl.⁵ .............................................. A23C 1/00
[52] U.S. Cl. .................................. 426/233; 219/411; 219/518; 426/520
[58] Field of Search ............... 426/231, 233, 241, 248, 426/520; 219/518, 354, 405, 411, 502

[56] References Cited

U.S. PATENT DOCUMENTS

| | | | |
|---|---|---|---|
| 2,440,476 | 4/1948 | Johnson | 219/518 |
| 2,575,426 | 11/1951 | Parnell | 426/241 |
| 3,244,859 | 4/1966 | Whiteford | 219/411 |
| 3,420,984 | 1/1969 | Berkl et al. | 219/502 |
| 3,682,643 | 8/1972 | Foster | 426/233 |
| 4,119,834 | 10/1978 | Losch | 219/354 |
| 4,126,777 | 11/1978 | Moore | 426/241 |
| 4,245,148 | 1/1981 | Gisske et al. | 219/502 |
| 4,664,923 | 5/1987 | Wagner et al. | 426/233 |
| 4,698,767 | 10/1987 | Wensel et al. | 219/502 |
| 4,733,054 | 3/1988 | Paul | 219/358 |

OTHER PUBLICATIONS

Miskella, Engineer's Handbook, page 32, 33, 1947.

*Primary Examiner*—Peter Kratz
*Attorney, Agent, or Firm*—Thomas W. Tolpin

[57] ABSTRACT

An improved lamp control process and assembly are provided to automatically and efficiently heat objects, such as plates of hot cooked food upon a counter in a restaurant. The lamp control assembly preferably includes heating lamps or heating elements, a photoelectric sensor or other sensor, a power control circuit, and a time delay circuit to slowly turn off the lamps when the plates of food are removed from the counter. Other loads can be controlled similarly.

4 Claims, 2 Drawing Sheets

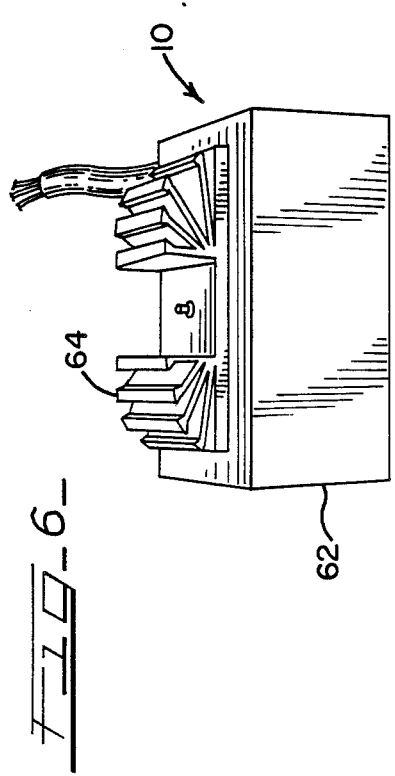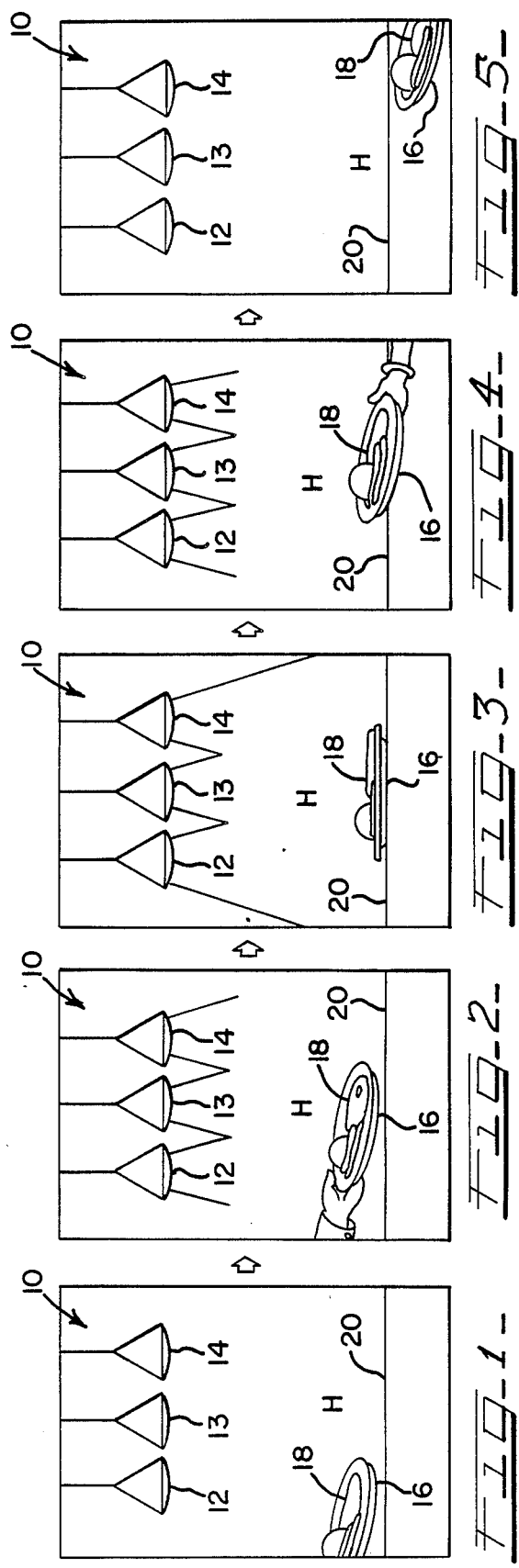

LAMP CONTROL PROCESS FOR WARMING FOOD

BACKGROUND OF THE INVENTION

This invention pertains to heat lamps, and, more particularly, to a lamp control assembly and process for warming food.

There are many types of restaurants, such as formal restaurants, informal restaurants, fast food restaurants, and cafeterias. In formal restaurants, customers are seated at tables with table cloths and napkins and may be waited upon by waiters in bow ties or waitresses in cocktail dresses. Customer attire in formal restaurants often includes ties, jackets, and dresses. At informal restaurants, customers are seated at tables which often have paper napkins and no table cloths and are usually waited upon by waitresses. The waitresses and customer attire is generally informal. Informal restaurants may also have a take out or carry out section for ordering and picking up food which is to be eaten out of the restaurant. In fast food restaurants, orders are placed from a car in a drive-in window or at a counter inside the fast food restaurant. There are no waiters or waitresses that wait on tables in fast food restaurants. In cafeterias, customers selects their food from counters, bins, or the like containing different selections of food and beverages. The customers place their food on trays and carry their trays to tables where they can eat their food. There are usually no waiters or waitresses in cafeterias.

Restaurants can become very busy during lunch, dinner and/or breakfast. Cooked food which is placed on the counter can become cold without a heat lamp, heating element, or other means to keep the food warm, especially if the waitresses or waiters are attending other tables or otherwise too busy to immediately serve the hot cooked food to their customers.

In many restaurants, cooked food is kept warm with heat lamps or heating elements until the food is served to the customers by waiters or waitresses. There are many types of heat lamps. Generally, one or more heat lamps or heating elements are mounted above a counter where plates of hot cooked food are placed. In the past, the heat lamps of conventional food warming circuits have been kept on continuously during all hours of service of the restaurant. This practice substantially decreases the life of the lamps (bulbs) and wastes electricity. Furthermore, it can be expensive to the restaurant and distractive to customers, especially when there is no food on the counter to be kept warm. Also, repeated replacement of bulbs is burdensome, inconvenient, time-consuming, and uneconomical.

It is, therefore, desirable to provide an improved food warming circuit and process which overcomes most, if not all, of the above problems.

SUMMARY OF THE INVENTION

An improved lamp control assembly and process are provided which are attractive, easy to use, economical, and effective. The improved lamp control assembly and process are efficient, preferably automatic, convenient, and safe. The improved lamp control assembly and process are especially useful for warming food, such as plates of hot cooked food placed on a counter in a restaurant, but can also be used for other purposes, such as intermittently drying, heating, or lighting various objects.

To this end, the improved lamp control assembly has a sensor or sensing unit to detect and sense the presence of an object, such as a plate of warm food, and control circuitry to activate or energize at least one lamp or heating element when the object is detected by the sensor. The sensor or sensing unit can comprise a photoelectric sensing assembly, a passive or active infrared sensing unit, an ultraviolet (UV) sensor, a pressure sensitive switch, or a heat (thermal-sensitive) detector. The control circuitry can include various switches, a lamp dimming circuit, and an adjustment circuit to automatically adjust and vary the intensity of the lamp(s) or heating elements(s) for a preselected time interval after the detector has automatically sensed the presence of the food or other object(s).

In use, when plates of hot cooked food are placed upon a counter in a restaurant, the heating lamps or heating elements above the food are activated automatically by the lamps control assembly and heat is emitted from the lamp upon the food to heat or maintain the temperature of the food above a preselected desired warming temperature, which is in part determined by the wattage and heating intensity of the selected lamp(s) or heating elements. When the plates of warm food are removed from the counter by waitresses or waiters, the lamps or heating elements are automatically deenergized or slowly turned off and their intensity is decreased, preferably after a set, predetermined period of time. Desirably, the placement and removal of plates of food on the counter are automatically detected, such as by photoelectric sensors.

A more detailed explanation of the invention is provided in the following description and appended claims taken in conjunction with the accompanying drawings.

BRIEF DESCRIPTION OF THE DRAWINGS

FIG. 1 is a perspective view of a plate of food as it is being placed under heat lamps in accordance with principles of the present invention;

FIG. 2 is a perspective view of the plate of food after it has activated the heat lamps;

FIG. 3 is a perspective view of the plate of food on a counter being warmed by heat lamps;

FIG. 4 is a perspective view of the plate of food being removed from the counter;

FIG. 5 is a perspective view of the plate of food being carried away after the heat lamps have been turned off;

FIG. 6 is a perspective view of the housing; and

DETAILED DESCRIPTION OF THE PREFERRED EMBODIMENTS

Figure 7:
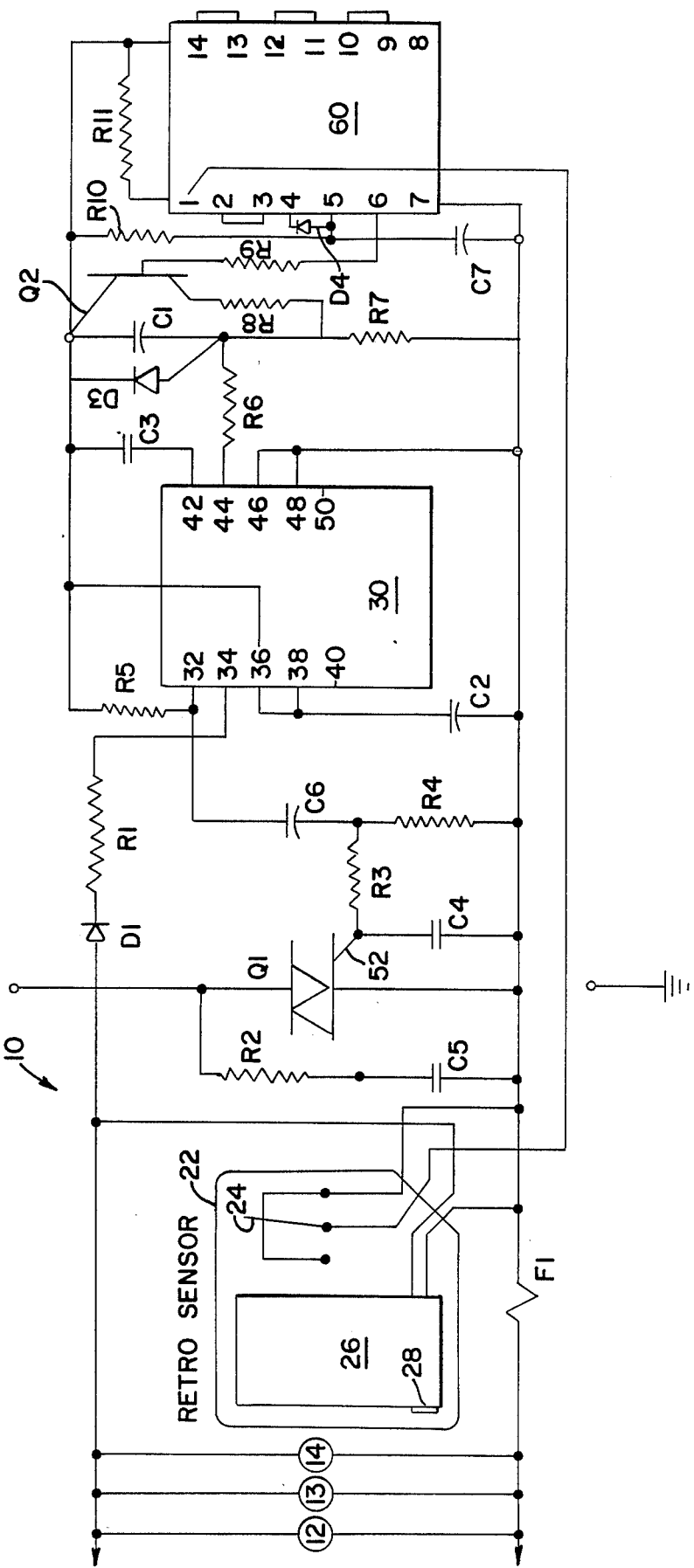
FIG. 7 is a schematic diagram of the electric circuitry of the lamp control assembly.

A lighting and heating control system 10 comprises an automatic compact lamp control assembly and unit to automatically regulate, control, and vary the temperature, amount, and intensity of heat and light. While the lighting and heating control system 10 is described with particular reference to restaurants, it is to be understood that the lighting and heating control system 10 can be used in other applications and for other uses.

The lamp control assembly 10 has or is connected to a set or series of heating elements or heat lamps 12–14 comprising electric heating bulbs. The heating elements or lamps 12–14 emit and radiate light and heat upon objects, such as plates 16 of hot, warm cooked food 18 upon a counter 20 of a restaurant. The lamps are mounted above the counter 20 and plates 16 of food 18 and are arranged in a symmetrical thermal heating pattern and array to heat and maintain the food 18 on the plates 16 above a preselected minimum temperature, such as 110 degrees F. in a heating zone H above and about the counter 20.

The lamp control assembly 10, which is also sometimes referred to as a controller or a Heat-Mizer lamp dimming unit, has a photoelectric sensing assembly and unit 22 (FIG. 7) to photoelectrically sense and detect the presence and absence of plates 16 of food 18 on the counter 20. The photoelectric sensing assembly 22 is aligned in registration with the heating zone of the counter 20 and emits, detects, and receives photoelectric beams of light by transmission, direct reflection, or retro-reflection. The photoelectric sensing assembly 22 can comprises a retro sensor with a photoelectric cell, switch, or relay 24 and a built-in power supply 26 and light source 28 comprising an infrared light emitting diode (LED). The response time ranges from 2 to 25 msec at temperatures ranging from about −10 degrees C. to about +55 degrees C. One useful type of photoelectric sensing assembly is available from Opcom Company in the 14100 series model. Other photoelectric sensing assemblies can be used.

As shown in FIG. 7, the lamp controller 10 has a dimming a phase firing power control circuit, integrated circuit device, part, and/or and assembly 30 which is connected to the heating elements or lamps 12-14 and photoelectric sensing assembly 22. The phase firing control circuit 30 automatically dims deenergizes, deactivates, and turns off the heating elements or lamps 12-14 when the plates 16 of food 18 are removed from the heating zone H above the counter 20. The phase firing circuit 30 also activates, energizes, and turns on, as well as concurrently, increases the intensity of the heating elements or lamps 12-14 when the plates 16 of food 18 are placed upon the counter 20 in the heating zone. The phase firing circuit 30 preferably comprises a power control circuit, such as is commercially available from Plessey Semiconductors Company, Ltd, model SL440. Model SL440 has an internal current limit detector with a buffer, a servo amplifier, a DC stabilizer, a crossover detector and reset generator, a variable delay pulse generator comprising a voltage controlled current source and level sense trigger, and a trigger pulse output amplifier. The power control circuit 30 provides conduction control and AC load current limitation. The power control circuit 30 also has pin connectors comprising: an output firing pulse pin 32, input to crossover detector pin 34, voltage stabilized pin 36, inhibit and current limit output pin 38, current limit AC input pin 40, timing capacitor C3 connected to pin 42, servo error output and conduction control pin 44, servo error input pin 46, a common neutral pin 48, and another current limit AC input pin 50.

The power control circuit 30 is a versatile integrated circuit which provides variable phase control of triacs and power switching devices. In the power control circuit 30, an external timing capacitor C3 connected to pin 42 is discharged during positive and negative half cycles of the driving waveform, such as at 60 Hz at a constant rate which is proportional to the output of the servo amplifier. When the charge reaches a preselected level, the conduction control circuit generates a firing pulse to trigger the triac Q1. The crossover detector pin 34 resets the timing cycle when the driving waveform passes through zero at which point the timing capacitor is rapidly recharged. The servo amplifier controls the conduction time of the triac Q1 and the power delivered to the load (lamps or heating elements) 12-14.

The preferred dimming and phase firing control circuit 30 (FIG. 7) is connected to a triac Q1 or solid state switching device with a gate 52 connected to the heating elements or lamps 12-14 via a capacitor C4 and a fuse F1. Preferably, a capacitor C6 and current limiter resistor R3 are positioned between and connected to the triac Q1 and the phase firing power control circuit 30. A bleed off resistor R4 is connected to the capacitor C6 and capacitor C4 through resistor R3. Positioned between and connected to the heating elements or lamps 12-14 and the phase firing control circuit 30 is a voltage limiter resistor R1 connected in series to a filtering device diode D1 to filter alternating current to pulsating direct current. The triac Q1 is connected in parallel to a snubber comprising a resistor R2 and capacitor C5 to help suppress electrical noise. Capacitor C4 also helps suppress electrical noise. The current limit resistor R3 substantially prevents excess current from entering the gate 52 of the triac Q1. The voltage limiter comprises resistor R1. Capacitor C2 also serves as a filtering device.

As shown in FIG. 7, the lamp controller 10 also has a time delay circuit, integrated circuit device, part, and/or assembly 60 which is connected to the dimming and phase firing control circuit 30 and coupled to the photoelectric sensing assembly 22 to delay activation, startup, and energization of the heating elements or lamps 12-14 for a preselected desired interval of time after the photoelectric sensing assembly 22 photoelectricity senses the absence of the plates 16 (FIGS. 1 and 2) of food 18 on the counter 20 in the heating zone H. The time delay circuit can include a turn-on delay device comprising a capacitor C1 connected in series with a resistor R7 and a current limit resistor R6. Capacitor C3 serves to limit and suppress electrical noise. Transistor Q2 is connected to the capacitor C1 and activates (turns on) and deactivates (turns off) the power control circuit 30 via the time delay circuit 60 as triggered by the photoelectric retro sensor 22. Useful time delay circuits are available from Motorola, under model numbers MM74C14and MC14584B.

In the preferred lamp control assembly 10 of FIG. 7, a resistor R8 is connected to the transistor Q2 and resistor R7. A resistor R9 connects the transistor Q2 to the time delay circuit 60 and is connected to resistor R8 through transistor Q2. A resistor R10 and capacitor C7 are connected in series to each other. Resistor R7 is connected to capacitor C1. A current limiter resistor R11 is connected to the time delay circuit 60. A filtering diode D3 can be connected to resistor R3 in parallel to capacitor C1. A capacitor C3 is connected to pin 42 of the dimming and phase firing circuit 30. Resistor R6 is connected to diode D3.

The preferred controller 10 (FIG. 4) has a retro sensor, a fuse F1, capacitor C5, resistor R2, triac switch Q1, gate 52, diode D1, resistor R1, capacitor C4, resistor R3, resistor R4, capacitor C6, resistor R5, capacitor C2, power circuit 30, capacitor C3 resistor R6, diode D3, capacitor C1, resistor R7, resistor R8, resistor R9, resistor R10, resistor R11, capacitor C7, time delay circuit circuit 30, and diode D4 connected to pin 5. Additional components can be added to the controller circuit, if desired.

The controller is preferably enclosed in a metal or impact-resistant plastic box-like housing 62 (FIG. 6) with a heat sink comprising outwardly extending external thermally radiating fins 64 for dissipating heat.

In use, when a plate 16 of food 18 is placed on the counter 20 (FIGS. 1-3), the photoelectric retro sensor 22 will detect the plate 16 of food 18 and fires (activates) the time delay circuit 60 which in turn immediately deactivates (turns off) transistor Q2 without any significant delay. Thereupon capacitor C1 will start charging up which in turn progressively energizes the power circuit 30. Energization of the power circuit will activate triac Q1 to activate (turn on) the heating elements or lamps 12-14.

When the plates 16 of food 18 are removed from the counter 20, the photoelectric retro sensor 22 detects the absence of the plate 16 of food 18 and activates (turns on) the time delay circuit 60. This sets up a charge across resistor R10 and energizes capacitor C7 to provide a preset time delay, as determined by the rated capacity of capacitor C7 or the time delay circuit 60, before the power circuit 30 is turned off. When this occurs, triac Q1 is deactivated (turned off).

Among the many advantages of the novel lamp control system and process are:
1. Outstanding Performance.
2. Enhanced longevity and wear of heating elements and lamps.
3. Economical.
4. Convenient to use.
6. Greater saving of electricity.
7. Automatic heating.
8. Safe.
9. Efficient.
10. Effective.

Although embodiments of the invention have been shown and described, it is to be understood that various modifications and substitutions, as well as rearrangements of parts, elements, components, and process steps, can be made by those skilled in the art without departing from the novel spirit and scope of this invention.

What is claimed is:

1. A food warming process, comprising the steps of:
   placing at least one plate of cooked food upon a stationary counter in a restaurant;
   optically sensing the presence of said plate of cooked food on said stationary counter;
   automatically activating at least one heat lamp or heating element above the food when the presence of said plate of cooked food on said stationary counter has been optically sensed;
   emitting heat from said lamp or heating element to said food to heat or maintain the temperature of said food above a preselected warming temperature;
   removing the plate of food from said stationary counter;
   optically sensing the absence of said plate of cooked food on said stationary counter;
   progressively and automatically dimming, gradually deenergizing, and sequentially decreasing the intensity of the lamp or heating element for a preselected period of time; and serving the plate of food to a customer.

2. A food warming process in accordance with claim 1 wherein said optically sensing comprises optically sensing said plate on said stationary counter with ultraviolet light emitted from an ultraviolet sensor.

3. A food warming process in accordance with claim 1 wherein said optically sensing comprises photoelectrically sensing said plate on said stationary counter.

4. A food warming process in accordance with claim 1 wherein said optically sensing includes optically sensing said plate on said stationary counter with infrared light from an infrared sensing unit.

* * * * *